Aug. 21, 1923. 1,465,378
P. STRONG
TRAP
Filed Oct. 28, 1921 3 Sheets-Sheet 2
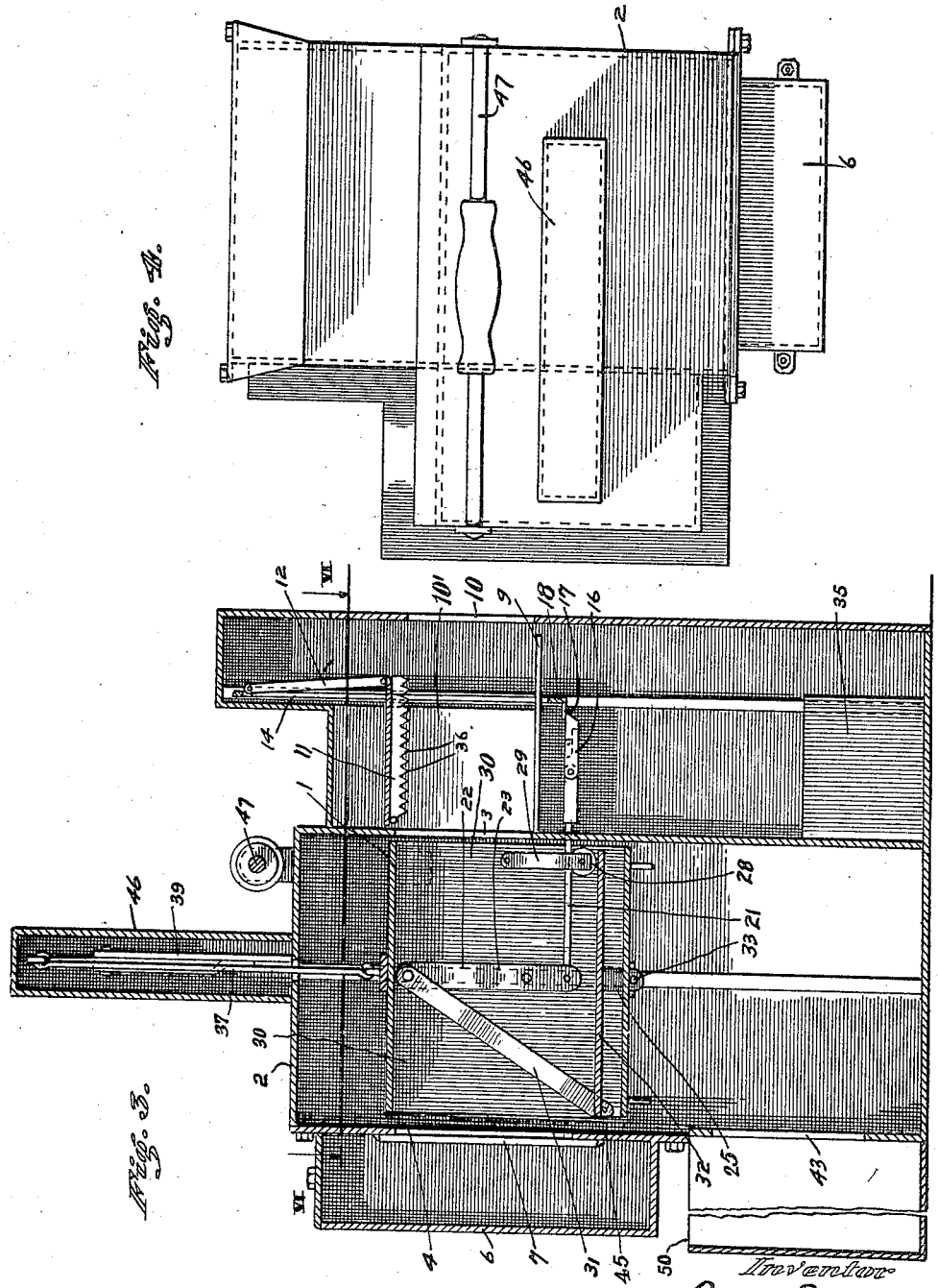
Inventor
PHILIP STRONG

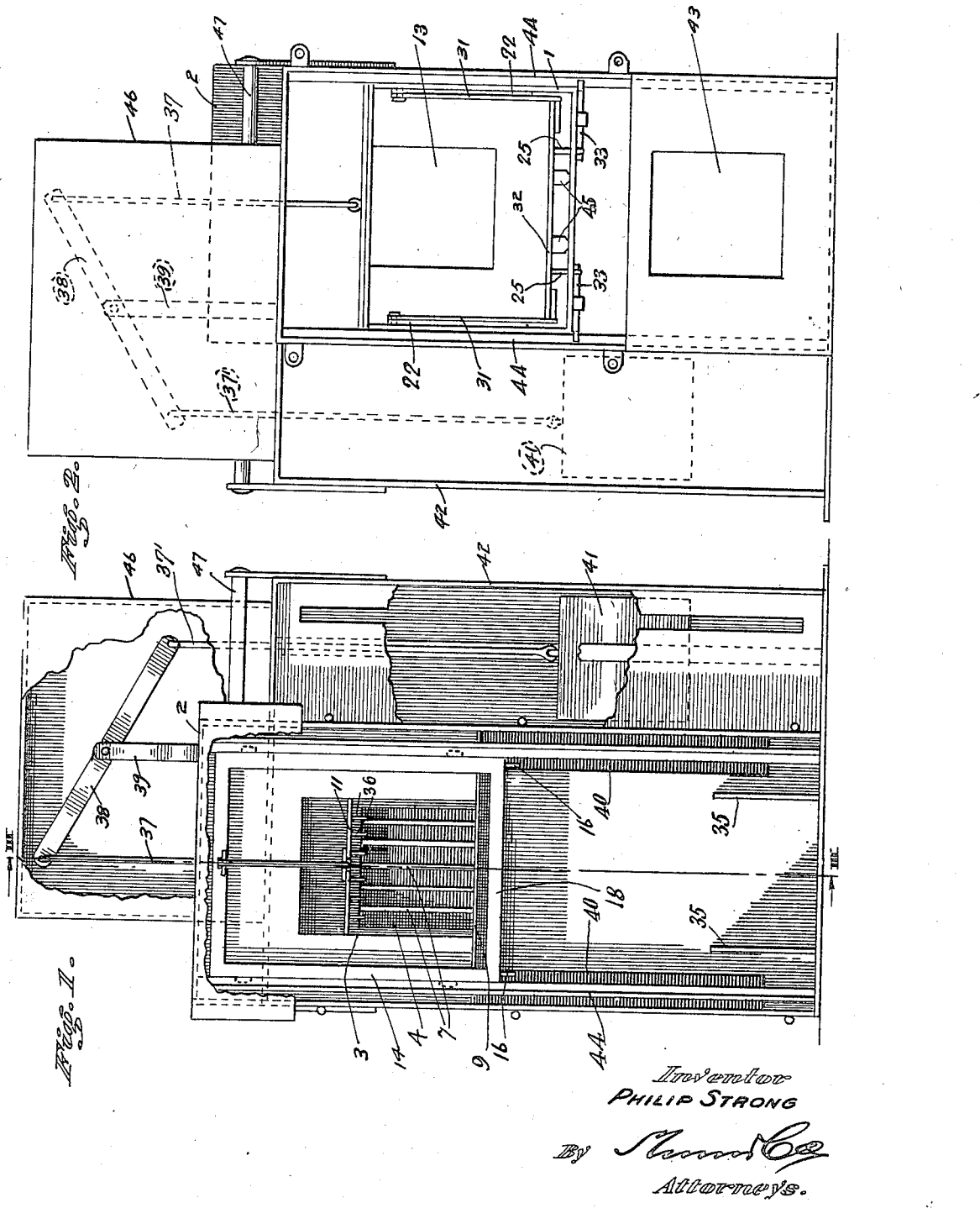

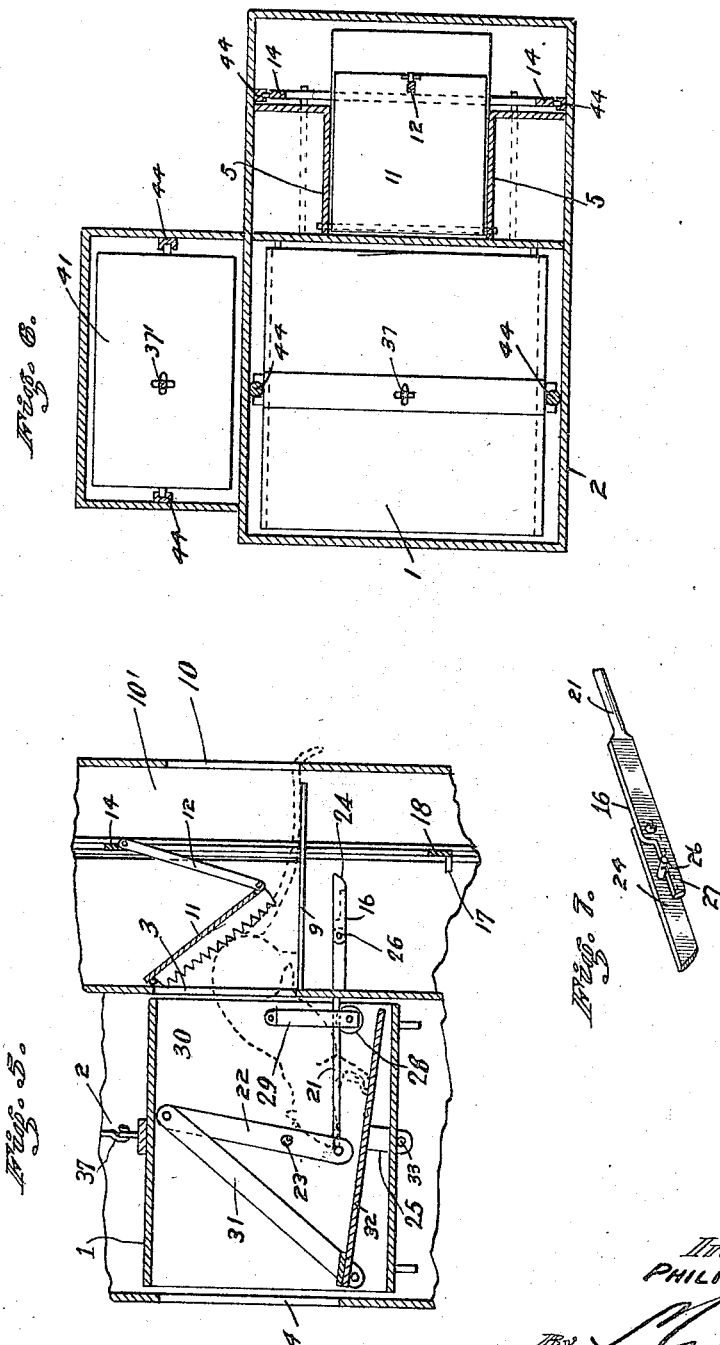

Patented Aug. 21, 1923.

1,465,378

UNITED STATES PATENT OFFICE.

PHILIP STRONG, OF OATMAN, ARIZONA.

TRAP.

Application filed October 28, 1921. Serial No. 511,117.

*To all whom it may concern:*

Be it known that I, PHILIP STRONG, a citizen of the United States, and a resident of Oatman, county of Mohave, and State of Arizona, have invented a new and useful Trap, of which the following is a specification.

The present invention relates to improvements in traps and its particular object is to provide a self-operating trap comprising an individual cage adapted to trap the animals and to deliver the same into a larger compartment, returning automatically to its old position after the animal has left the same. This trap once set up needs hardly any attention and is especially adapted to be used in places where animals to be trapped are plentiful since it automatically sets itself again after delivering the animal trapped to the larger compartment, and its capacity is defined only by the size of the confining compartment into which the animals are delivered. Other advantages will appear as the description proceeds.

The preferred form of my invention is illustrated in the accompanying drawings in which Figure 1 shows a front view of my trap, certain portions being removed so as to disclose the interior of the same; Figure 2 a rear view; Figure 3 a vertical cross section along line 3—3 of Figure 1; Figure 4 a top plan view; Figure 5 a fragmentary view illustrating the working of the trapping device; Figure 6 a horizontal cross section along line 6—6 of Figure 3, and Figure 7 a perspective detail view of a tripping device used in connection with my trap.

While these drawings show the preferred embodiment of my invention, I wish to point out that the same may be changed in many details without departing from the spirit of my invention and without leaving the scope of the claims hereto attached.

My device comprises two principal portions co-operating with each other, the trap proper and automatic means for emptying the trap each time an animal is caught and returning the same to its active position. The trap proper comprises a cage (1), slidably mounted in a shaft (2) which latter is provided with an opening (3) in front and an opening (4) in the rear, both of which register with the cage (1) when the latter, which is open in the front and in the rear, is in its uppermost position. The opening (4) leads into a chamber (6) secured to the outside of the shaft (2) and separated from the shaft by a plurality of bars (7). This chamber (6) is provided for the bait and the bars (7) prevent the animal to be caught from eating the same. A platform (9) communicating with the entrance opening (10) leads through the entrance compartment (10′) to the opening (3) which latter is adapted to be closed by the trap door (11) hingedly secured near the top of the opening in two angled walls (5) and normally held in a horizontal position such as shown in Figure 3 by means of a link (12), the free end of which is supported on a frame (14) slidably mounted in an adjacent portion of the trap with freedom of vertical motion. Normally the said frame (14) is held in its uppermost position so as to hold the door (11) horizontally by means of the two tripping devices (16) engaging a projection (17) secured to the lower member (18) of the frame. Each tripping device comprises a rod (21), one end of which is pivotally secured to the lever (22) pivoting on the pin (23), while the other end engages the projection (17) mentioned hereinabove. The latter end is shown in detail in Figure 7 and has a dog (24) pivotally connected thereto, the dog being provided with a pin (26) engaging a reduced extension (27) of the rod whereby the pivotal motion of the dog (24) is limited to one direction.

To further the ease of operation I support a central portion of each rod on a wheel (28) held in the bracket (29) secured to the wall (30) of the cage. The upper end of each lever (22) is connected by a diagonal link (31) to a false floor (32) which is pivotally supported above the real bottom of the cage by means of two downwardly extending clips (25) pivotally engaging transverse rods (33). It will be noticed that the false floor (32) is positioned somewhat below the opening (3) so that an animal entering the cage through the opening (3) and stepping down on the false floor will immediately throw the larger portion of its weight on the latter and would thereby be prevented from suddenly returning upon becoming suspicious. The apparatus thus far described operates as follows:

To allow the animal to be trapped to enter through the entrance opening (10) the surface of the ground around the front end of the trap is elevated to lead up to the entrance. Assuming the animal to be caught has smelled the bait and is trying to get near the same and for this purpose steps on the platform (9) and advances further until it reaches the cage. Deciding to cross the cage in order to get the bait, the animal sets its front feet on the front end of the false floor (32) whereby the latter is pressed downward. Simultaneously the rear end of the false floor rises, causes the lever (22) to pivot on the pin (23) and thereby pulls the rod (21) rearwardly disengaging the tripping device (16) from the projection (17) of the frame (14). The latter thereupon slides downward immediately and causes the door (11) to fall against the opening (3), pushing the animal into the cage altogether. The downward motion of the frame is limited by the two stops (35). The door (11) is provided with teeth (36) which will cause the animal to jump forward even if it should have become suspicious and should try to return. On advancing it will place part of its weight on the rear end of the false bottom and return the same to its level position, two downwardly extending clips (45) preventing the rear end from going beyond a level position. The animal is now confined in the cage which is connected by means of the cable (37) to one end of the walking beam (38) pivotally supported on the bracket (39) rising from the top of the shaft (2). The other end of this walking beam supports by means of a cable (37') a suitable weight (41) slidably mounted in an adjacent shaft (42). The cage and the weight are so balanced that the weight is heavier than the empty cage but is lighter than the cage having an animal trapped therein. The natural consequence of the animal being in the cage is then to force the cage downward until its open rear end registers with the opening (43) leading into a larger compartment (50). The animal seeing the opening will naturally leave the cage and enter the compartment whereupon the weight will pull the cage upward again to its original active position.

Particular attention is called to the operation of the tripping devices. It will be remembered that during the beginning of the operation the rods (21) were withdrawn in a longitudinal direction when the animal first stepped on the false floor of the cage, whereby the frame (14) was caused to slide downwardly thereby closing the trap door (11). Immediately thereafter the whole cage is caused to move downwardly by the weight of the animal and during this operation the tripping devices (16) sliding downward with the cage along slots (40) in the front wall of the shaft (2) pass the projection (17), the dogs (24) pivoting upwardly when striking the projection and falling down again into their old positions after having passed the same so that when the cage starts on its upward travel the dogs (24) engage the projection (17) and pull the frame (14) upward with them, whereby the trap door (11) is lifted to its active position as shown in Figure 3.

To facilitate the operation of the device I provide suitable guide members (44) for the weight as well as for the cage and the frame, it being understood that I do not wish to confine myself to any particular guide track but wish to be protected on any suitable means for insuring an easy operation of the device. I also wish to have it understood that I do not confine myself to the walking beam arrangement shown in the drawing since similar results may be obtained in many different ways, the principle of my invention being the proper balancing of the cage and the weight. A casing (46) may be added to the device to enclose the walking beam in the manner shown and to facilitate the handling of the device a handle (47) may be attached to the device in the manner shown in the drawing.

I claim:

1. In a trap of the character described, a vertical shaft having an entrance opening therein and means for supporting a bait oppositely said entrance opening, a platform communicating with the entrance opening, an open-ended cage slidably supported in the shaft having a false bottom pivotally supported over its floor, a trap door pivotally hinged over the platform, a vertically sliding frame associated with the door adapted to hold the door open when the frame is in its uppermost position, a tripping device for normally holding the frame in the latter position, and an operative connection between the tripping device and the false bottom for tripping the device when an animal steps on the false bottom.

2. In a trap of the character described, a vertical shaft having an entrance opening therein and means for supporting a bait oppositely said entrance opening, a platform communicating with the entrance opening, an open-ended cage slidably supported in the shaft having a false bottom pivotally supported over the floor, balancing means for normally holding the cage in an uppermost position adapted to yield under the weight of an animal in the trap, a trap door pivotally hinged over the platform, a vertically sliding frame associated with the door adapted to hold the door open when the frame is in its uppermost position, a tripping device for normally holding the frame in the latter position, and an operative connection between the tripping device and the false bottom for tripping the former when an animal steps on the false bottom, the tripping device being adapted to regain its hold on the frame when the cage descends under the weight of the animal.

3. In a device of the character described, a tripping device for a door hinged on a horizontal pivot comprising a vertically sliding frame operatively engaging said door adapted to drop the same when sliding downwardly, horizontal rods extending into the path of the frame for normally holding the same, a false bottom supported pivotally, and an operative connection between the rods and the bottom whereby the former is withdrawn from the frame when the bottom is stepped upon.

4. In a device of the character described, a tripping device for a door hinged on a horizontal pivot comprising a vertically sliding frame operatively engaging said door adapted to drop the same when sliding downwardly, horizontal rods extending into the path of the frame for normally holding the same, a false bottom supported pivotally, and an operative connection between the rods and the bottom whereby the former is withdrawn from the frame when the bottom is stepped upon, comprising levers pivotally engaging one end of the rods and links secured to the false bottom engaging the levers at the opposite end.

5. In a device of the character described, a tripping device for a door hinged on a horizontal pivot comprising a vertically sliding frame operatively engaging said door adapted to drop the same when sliding downwardly, horizontal rods extending into the path of the frame for normally holding the same, a false bottom supported pivotally, and an operative connection between the rods and the bottom whereby the former are withdrawn from the frame when the bottom is stepped upon, said rods being yieldable in one direction so as to be able to pass the frame on a downward motion for the purpose of reengaging the same.

PHILIP STRONG.